United States Patent [19]

Alexander et al.

[11] 4,443,107

[45] Apr. 17, 1984

[54] OPTICAL DISPLACEMENT SENSOR

[76] Inventors: David H. Alexander, 19406 Hinsdale Ave., Torrance, Calif. 90503; Kachu Ishizuka, 29237 Whitley Collins Dr., Rancho Palos Verdes, Calif. 90274; Robert N. Sato, 50 Montemalaga Plz., Palos Verdes Estates, Calif. 90274

[21] Appl. No.: 289,255

[22] Filed: Aug. 3, 1981

[51] Int. Cl.³ .................... G01B 11/14; G01C 3/08
[52] U.S. Cl. .................... 356/373; 356/5; 356/375
[58] Field of Search ............ 356/5, 373, 375, 4, 356/358, 3, 4.5, 15, 374; 250/211 R, 578, 201

[56] References Cited

U.S. PATENT DOCUMENTS

| | | | |
|---|---|---|---|
| 3,326,078 | 6/1967 | Clarke et al. | 356/5 |
| 4,181,901 | 1/1980 | Heyke | 250/211 J |
| 4,209,241 | 6/1980 | Nanba et al. | 356/5 |
| 4,223,215 | 9/1980 | Chamran et al. | 250/211 R |

FOREIGN PATENT DOCUMENTS 148246 12/1962 U.S.S.R. ..................... 356/5

OTHER PUBLICATIONS

Compton, Jr., M. E., "Surveying with the Velocity of Light", Surveying & Mapping, Jul.-Sep., 1954, pp. 283-292.
Christensen et al., "Photoconductive Cell", RCA Tech. Note #516, 3-1962.
Born et al., "Principles of Optics", Fifth Ed., Pergamon Press, 1975, pp. 277-281.

Primary Examiner—William H. Punter
Attorney, Agent, or Firm—Koda and Androlia

[57] ABSTRACT

A device and method for accurately sensing the direction and magnitude of small displacements between two objects, independent of the distance between the objects, utilizing a monochromatic light source and a reflector to produce a light standing wave pattern and a transparent photosensitive detector to detect the number of crests and/or nodes of the light standing wave pattern intercepted.

6 Claims, 9 Drawing Figures

OPTICAL DISPLACEMENT SENSOR

BACKGROUND OF THE INVENTION

1. Field of the Invention

This invention relates to displacement measurement devices and more particularly to devices wherein light is utilized to accurately sense very small relative displacement between two objects.

2. Description of Prior Art

There are numerous occasions when it is desireable to sense very precisely any relative displacement between two objects. Often it is desireable that the accuracy of measurement of such displacement be independent of ambient conditions such as temperature, moisture, etc. Many attempts have been made to provide such precise measurement with varying degrees of sucess. The existing art consists of three basic types of devices: those employing interferometer techniques, those employing optical gratings, and those using optical resonant cavities.

An example of an interferometer type of device is disclosed in U.S. Pat. No. 3,666,371 issued to Hendrik de Lang on May 30, 1972. Such devices typically require at least two optical arms requiring accurate positioning. Also the interferometer approach typically employs multiple optical surfaces between the light source and the measurement surface giving rise to the potential of optical distortion from the optical surfaces.

Examples of grating devices include U.S. Pat. No. 3,364,813 issued to R. L. McKinney Jan. 23, 1968; U.S. Pat. No. 4,115,008 issued to Alexander Turnbull Shepard Sept. 19, 1978; U.S. Pat. No. 4,079,252 issued to David George Brake Mar. 14, 1978 and U.S. Pat. No. 4,266,535 issued to Knut Heitmann et al Oct. 7, 1980. Typically these devices are accuracy limited because the measurement accuracy is determined by the grating which is susceptible to environmental effects and external damage. Furthermore, it is difficult to maintain grating accuracy while mounted on a moving object. The maximum distance measured with the grating type of device is limited by the grating length itself.

Examples of resonant cavity devices include U.S. Pat. No. 3,476,483 issued to Richard F. Weeks Nov. 4, 1969 and U.S. Pat. No. 3,514,207 issued to Hendrik de Lang et al May 26, 1970. These devices require a two port laser. They also typically require a cavity for each measurement device and a beam splitter to detect direction of motion.

All three approaches typically utilize a simple amplitude photodetector for measuring the light beam. This type of detector essentially absorbs the incident light beam completely.

SUMMARY OF THE INVENTION

This invention makes use of the principle of standing waves of light to accurately sense a very small displacement of one object with respect to another by means of an electro-optical sensor and a reflecting mirror. With a collimated beam of monochromatic light, the standing wave pattern produced by reflecting light at normal incidence from a reflective surface is monitored by a photosensitive detector. The reflective surface is mounted on one of the objects and the photosensitive detector is mounted on the other. The device measures displacement by counting the number of crests and/or nodes of the standing wave pattern intercepted by the detector rather than measuring the amount of light impinging on the detector. This permits displacement measurement in units of $\lambda/2$ where $\lambda$ is the wavelength of the light source.

The invention consists of a transparent photosensitive detector, a reflective surface, a source of monochromatic collimated beam of light and detection and counting circuitry. A polarizer and a $\lambda/4$ retarder may be used in front of the light source to prevent the return beam from re-entering the light source.

With this approach, the problem of positioning multiple optical elements on multiple optical arms is reduced by utilizing one optical arm. Also, there are no optical surfaces between the source of the measured beam and the measuring surface such as are required by the interferometer approach.

As opposed to the grating type of approach, the maximum measurable distance using this invention is limited by the coherence length of the monochromatic source. This can be much longer than it is feasible to make an accurate grating. Furthermore, the scale is a standing wave pattern which will maintain its position in space more accurately than a large grating.

In order to detect the direction of relative motion between the two objects the photosensitive detector is constructed of two parallel detecting layers slightly offset from each other along the standing wave pattern axis. By comparing the outputs of the two detecting layers with respect to time (i.e., comparing the phase relationship of these outputs) the direction as well as the amplitude of relative displacement can be ascertained. Thus, a beam splitter is not required to detect the direction of motion.

Because this invention does not employ a laser cavity, a two port laser is not needed. A simple one port monochromatic source can operate multiple distance measurement devices. Also, the present invention employs a transmitting photodetector which only absorbs a small fraction of the light beam.

DETAILED DESCRIPTION

Figure 1:
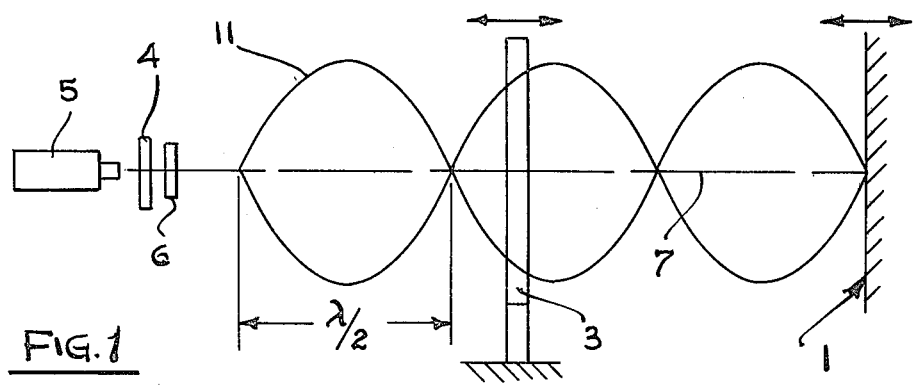
FIG. 1 depicts schematically the relative position of the basic elements of the invention and the standing wave pattern.

This is a detailed description of one preferred embodiment of the invention for accurately sensing and measuring the relative displacement between two objects. A reflective surface 1 may be fixedly mounted on one of the objects. A transparent photosensitive detector 3 may be fixedly mounted on the second of the two objects. The detector 3 should be mounted such that the flat plane of the detector is essentially parallel to the reflective surface 1. A monochromatic light source 5 capable of emiting a collimated beam of monochromatic light 7 may be mounted such that the beam of light 7 passes through the detector 3 and is reflected directly back from the reflective surface 1 to form a standing wave light pattern, the envelope of which is depicted at 11. A polarizer 4 and a λ/4 retarder 6 may be inserted in the light path between the light source and the first detector if desired to optimize system performance. As shown in FIG. 1, the envelope of the standing wave will form nodes along the longitudinal axis of the standing wave which axis will be coincident with the axis of the collimated light beam 7. If the wave length of the emitted light is designated λ, the distance between consecutive nodes or consecutive crests of the standing wave pattern will be λ/2.

If either of the objects is displaced with respect to the other along the axis of the light beam 7, the reflective surface 1 will be linearly displaced with respect to the detector 3 causing the detector 3 to intercept a number of nodes and crests of the standing wave envelope 11 proportional to the relative displacement between the two objects.

Figure 2:
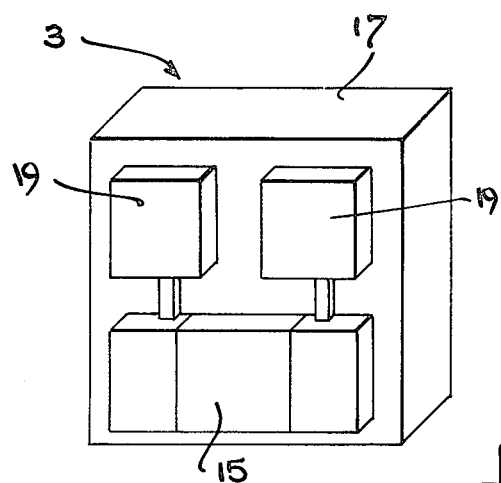
FIG. 2 depicts the composition of the basic photodetector.

FIG. 2 depicts the composition of the detector 3. A photosensitive detector layer 15, such as a silicon material, is deposited on a transparent substrate 17. Two bonding pads 19 to enable electrical connection of external circuitry to the detector layer 15 are also deposited on the substrate 17 such that the two bonding pads 19 are electrically in contact with opposite ends of the detector layer 15.

Figure 3:
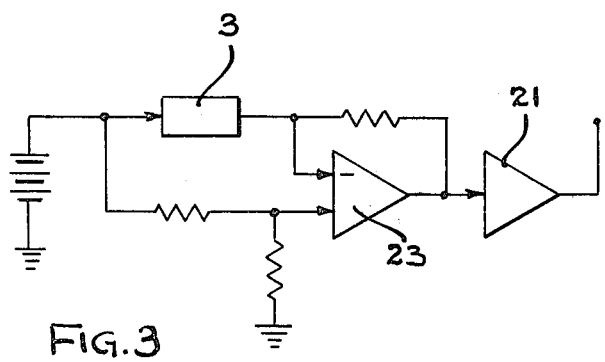
FIG. 3 depicts schematically the electrical circuit for counting the nodes or crests intercepted by the photodetector.

The detector layer of 3 may be electrically connected to the circuit shown schematically in FIG. 3. The photons of light impinging upon the detector 3 interact with the photosensitive detector layer 15 atoms to generate electron-hole pairs. An electrical bias across the detector layer 15 causes a current to flow through the circuit, the magnitude of the current being proportional to the quantity of photons impinging on the detector layer 15. The current may be amplified in the amplifier 23 and the number of crests or the number of nodes may be counted by the electronic counter 21.

Figure 4:
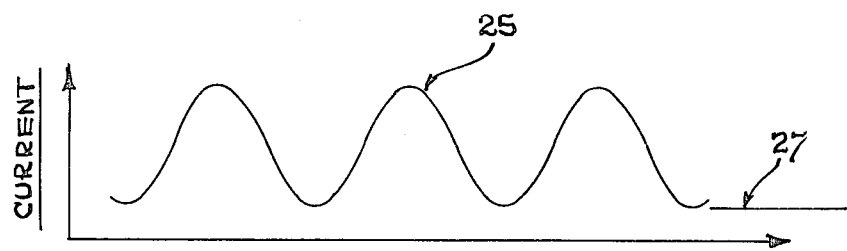
FIG. 4 depicts graphically the amplitude of photodetector output current.

As is shown in FIG. 4, the current output 25 from the detector 3 will vary in amplitude as the distance between the detector 3 and the reflective surface 1 is varied. This current is composed of two elements; the photon induced current and a quiescent or "dark" current 27 which exists when no photons are incident on the detector or when the detector is at a node position in the standing wave pattern. It is desirable that the proportion of dark current 27 to the composite output current 25 be minimized through proper selection of detector geometry and circuitry.

Figure 5A:
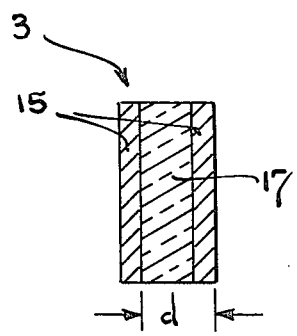
FIGS. 5a through 5c depicts alternate configurations of a multi photosensitive layer detector.
Figure 5B:
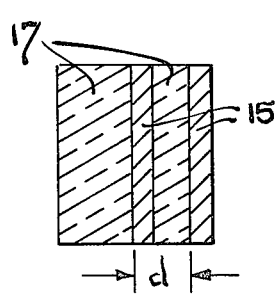
Figure 5C:
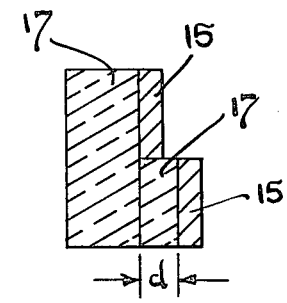
Figure 6:
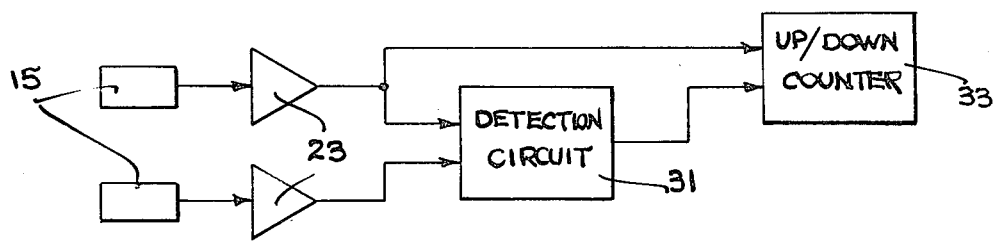
FIG. 6 schematically depicts the electrical circuit for determining direction and amplitude of relative displacement.

In order to detect the direction as well as the amplitude of relative displacement, the detector 3 may be constructed of two parallel photosensitive detector layers 15 separated on the transparent substrate 17 by a predetermined optical distance d. Three possible configurations of such a detector are depicted in FIG. 5. In each configuration $$d = \left(\frac{n}{2} \pm \frac{1}{8}\right),$$

where n is any integer. If the electrical output of each of the detector layers 15 is fed into a separate amplifier 23 as is shown in FIG. 6, the output of the two amplifiers may be fed into a direction detecting circuit 31 which compares them with respect to time and an up/down counter 33. Thus both the direction and amplitude of linear displacement between the two objects may be accurately determined.

Figure 7:
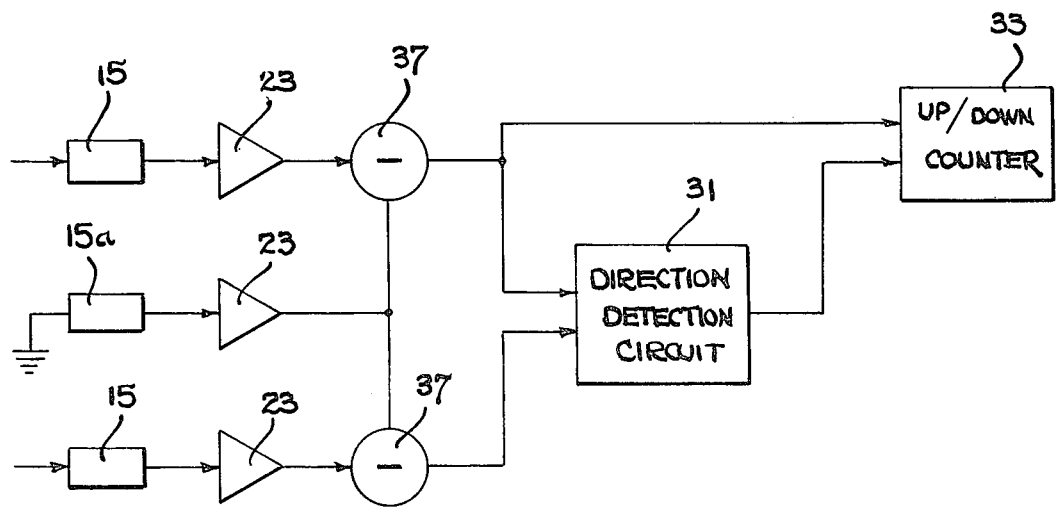
FIG. 7 schematically depicts a three detector arrangement minimizing the effects of quiescent current.

In order to minimize the quiescent current, a reference detector layer 15 may be added as shown schematically in FIG. 7. The thickness of the reference detector layer 15A may be chosen to have the same quiescent current as the other two detector layers 15. With the reference detector layer of a proper optical thickness, the output of the reference detector layer may be fed through an amplifier 23 and the output combined through subtraction circuits 37 with the amplified output of each of the detector layers 15.

We claim:

1. A device for accurately measuring relative linear displacement between two elements comprising:
   a standing wave light pattern produced by the impingement of a single monochromatic light beam on a reflector,
   a transparent photosensitive detector provided in the standing wave pattern movable relative to said reflector and capable of detecting the crests and nodes of said standing wave intercepted by said detector, said transparent photosensitive detector comprising two parallel photosensitive detectors each normal to the longitudinal axis of said standing wave and separated from each other by a finite distance along said light beam,
   counting means capable of determining the number of crests and/or nodes of said standing wave pattern passing through said photosensitive detector, and
   direction sensing means determining the direction and relative movement between said photosensitive detector and said reflector, said direction sensing means comprising circuit means for comparing the electrical current output of each of said parallel photosensitive detectors.

2. The device of claim 1 wherein said standing wave pattern is generated by causing the collimated output beam of a single monochromatic light source to impinge upon said reflector to cause said impinging monochromatic beam to reflect back upon said impinging beam.

3. The device of claim 1 wherein said standing wave pattern is generated by causing the collimated output beam of a single monochromatic light source to impinge normally upon a flat surface which acts as said reflector of light at the frequency of said light source.

4. The device of claim 1 wherein said photosensitive detector comprises,
   a thin layer of a transparent or semi-transparent semiconductor material which generates quantities of free electrical carriers proportional to the magnitude of light energy impinging on said material,
   a transparent substrate material upon which said material is mounted,
   electrical means biasing said material such that said electrical carriers are swept across said material, and
   circuit means producing an electrical current proportional to the quantity of said free electrical carriers generated.

5. The device of claim 1 wherein said counting means comprises circuitry means capable of producing an electrical output of maximum amplitude when said photosensitive detector is detecting a crest of said standing wave pattern and minimum amplitude when said photosensitive detector is detecting a node of said standing wave pattern, or vice versa.

6. A method of accurately measuring relative linear displacement between two objects comprising the steps of:
fixedly mounting a reflector surface on one of said objects,
fixedly mounting a transparent photosensitive detector made of a semiconductor material, whose output is proportional to the magnitude of the light energy impinging on it, on the second of said objects, said photosensitive detector comprising two parallel photosensitive detectors separated from each other by a finite distance,
causing a single collimated beam of a monochromatic light to pass through said photosensitive detector and reflect off said reflector in a manner to establish a standing wave pattern,
detecting each crest and/or node of said standing wave pattern intercepted by said transparent photosensitive detector,
counting the number of crests and/or nodes of said standing wave pattern passing through said photosensitive detector,
comparing the electrical outputs of the two detectors with respect to time, and
determining the direction of relative movement between the two objects from comparisons with respect to time of the outputs of the two detectors.

* * * * *